United States Patent
Saalfeld et al.

(10) Patent No.: US 12,339,394 B2
(45) Date of Patent: Jun. 24, 2025

(54) DISTRIBUTED AND SCALABLE SYSTEM FOR EMULATING RADIO FREQUENCY CHANNELS

(71) Applicant: Rohde & Schwarz GmbH & Co. KG, Munich (DE)

(72) Inventors: Maximilian Saalfeld, Munich (DE); Rachid El Assir, Munich (DE); Alois Ascher, Landshut (DE); Lisa Mayr, Munich (DE); Thomas Barth, Munich (DE); Thomas Haberl, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 339 days.

(21) Appl. No.: 18/066,723

(22) Filed: Dec. 15, 2022

(65) Prior Publication Data
US 2024/0201327 A1 Jun. 20, 2024

(51) Int. Cl.
*G01S 7/40* (2006.01)
*G01S 13/931* (2020.01)

(52) U.S. Cl.
CPC ........... *G01S 7/4082* (2021.05); *G01S 13/931* (2013.01)

(58) Field of Classification Search
CPC .. G01S 13/931; G01S 7/4082; H04B 17/3911
See application file for complete search history.

(56) References Cited

U.S. PATENT DOCUMENTS

| | | | |
|---|---|---|---|
| 2007/0127559 A1* | 6/2007 | Chang | H04B 17/0087 375/213 |
| 2020/0319325 A1* | 10/2020 | Kong | G01S 7/4021 |
| 2021/0356561 A1* | 11/2021 | Li | G01S 7/4095 |
| 2024/0202401 A1* | 6/2024 | Chen | G06F 30/20 |

\* cited by examiner

*Primary Examiner* — Timothy X Pham
(74) *Attorney, Agent, or Firm* — Studebaker Brackett PLLC

(57) ABSTRACT

A system for emulating radio frequency channels is provided. Said system comprises an input device for inputting a channel scenario, a channel coordinator device being in connection with the input device, and at least two channel emulator devices each being in connection with the channel coordinator device and for outputting a corresponding radio frequency signal to emulate the channel scenario. In this context, the channel coordinator device is configured to control each of the at least two channel emulator devices on the basis of the channel scenario and/or geometrical information with respect to the at least two channel emulator devices.

19 Claims, 5 Drawing Sheets

DISTRIBUTED AND SCALABLE SYSTEM FOR EMULATING RADIO FREQUENCY CHANNELS

TECHNICAL FIELD

The disclosure relates to emulating radio frequency channels in a distributed and scalable manner. In particular, the disclosure relates to a system for emulating radio frequency channels, a channel coordinator device for a system for emulating radio frequency channels, and a method for emulating radio frequency channels.

BACKGROUND ART

Generally, in times of an increasing number of applications employing radio frequency circuitry, there is a growing need of a system for emulating radio frequency channels, a channel coordinator device for a system for emulating radio frequency channels, and a method for emulating radio frequency channels to perform measurements with respect to a device under test comprising such an application for verifying correct functioning of said applications in a highly accurate and efficient manner, wherein even several devices under test can be tested simultaneously.

Nevertheless, such a system for emulating radio frequency channels, such a channel coordinator device for a system for emulating radio frequency channels, and such a method for emulating radio frequency channels are not known.

SUMMARY

Thus, there is a need to provide a system for emulating radio frequency channels, a channel coordinator device for a system for emulating radio frequency channels, and a method for emulating radio frequency channels to perform measurements in a highly accurate and efficient manner, wherein even several devices under test can be tested simultaneously.

This is achieved by the embodiments provided in the enclosed independent claims. Advantageous implementations of the present disclosure are further defined in the dependent claims.

According to a first aspect of the invention, a system for emulating radio frequency channels is provided. Said system comprises an input device for inputting a channel scenario, a channel coordinator device being in connection with the input device, and at least two channel emulator devices each being in connection with the channel coordinator device and for outputting a corresponding radio frequency signal to emulate the channel scenario. In this context, the channel coordinator device is configured to control each of the at least two channel emulator devices on the basis of the channel scenario and/or geometrical information with respect to the at least two channel emulator devices. Advantageously, not only a particularly high accuracy and efficiency can be ensured, but also several devices under test can be tested simultaneously especially due to distribution and scalability of the at least two channel emulator devices.

According to a first preferred implementation form of the first aspect of the invention, the channel coordinator device is configured to provide a sync signal for at least a part, preferably each, of the at least two channel emulator devices for synchronizing the respective ones of the at least two channel emulator devices in accordance with a common time base. Advantageously, for instance, the channel coordinator device can be configured to send timestamping to at least the part, preferably each, of the at least two channel emulator devices, thereby reducing complexity, which leads to an increased efficiency.

According to a second preferred implementation form of the first aspect of the invention, at least a part, preferably each, of the at least two channel emulator devices is configured to perform a modulation to form the respective ones of the at least two corresponding radio frequency signals. Advantageously, for example, at least a part, preferably each, of the at least two corresponding radio frequency signals comprises or is a modulated signal, thereby increasing flexibility, and thus also efficiency.

According to a further preferred implementation form of the first aspect of the invention, the channel coordinator device is configured to control the modulation on the basis of the geometrical information and/or consideration of at least one of respective delay, especially pass delay, loss, especially pass loss, frequency shift, especially Doppler shift, reflection, especially micro reflection, or any combination thereof. Advantageously, for instance, the channel coordinator device can be configured to provide respective channel emulation parameter sets for the at least two channel emulator devices, thereby controlling the at least two channel emulator devices or the corresponding modulations, respectively, in a particularly efficient manner.

According to a further preferred implementation form of the first aspect of the invention, the channel coordinator device is configured to control at least a part, preferably each, of the at least two channel emulator devices such that fading is added to emulate multipath and/or atmospheric effects. Additionally or alternatively, at least a part, preferably all, of the at least two channel emulator devices is configured to form a radio frequency fading simulator, especially a distributed and/or scalable radio frequency fading simulator. In further addition to this or as a further alternative, fading is added for and/or in the context of wireless communication, mobile communication, satellite communication, or any combination thereof. Advantageously, for example, a real-world environment can be reproduced in a particularly realistic manner, which leads to a significantly high accuracy.

According to a further preferred implementation form of the first aspect of the invention, the channel coordinator device is configured to perform a channel mapping to the at least two channel emulator devices on the basis of the channel scenario and/or the geometrical information. Advantageously, for instance, as long as the configuration of the system, especially the spatial distribution of the at least two channel emulator devices, is not changed, the channel mapping has only to be performed once and then keeps being valid, thereby ensuring a high efficiency.

According to a further preferred implementation form of the first aspect of the invention, the channel scenario comprises or is at least one of a communication scenario, especially a communication link scenario, a radar scenario, a traffic scenario, or any combination thereof. Advantageously, for example, a particularly high flexibility can be ensured, thereby also guaranteeing a high efficiency. Further advantageously, exemplarily in the context of the traffic scenario or testing autonomous vehicles, respectively, it is noted that at least a part, optionally each, of the at least two corresponding radio frequency signals can comprise or be an optical signal, especially a Lidar ("laser-based optical method for measuring distance and velocity") signal, and/or an ultrasonic signal.

According to a further preferred implementation form of the first aspect of the invention, the geometrical information comprises or is an absolute position of at least a part, preferably each, of the at least two channel emulator devices and/or a relative position regarding at least a part, preferably each, of the at least two channel emulator devices with respect to each other. Advantageously, for instance, especially in the context of said relative position, it is noted that the system or at least the at least two channel emulator devices can be movable, thereby increasing flexibility, and thus also efficiency.

According to a further preferred implementation form of the first aspect of the invention, the input device is configured to input the geometrical information. In addition to this or as an alternative, the geometrical information comprises or is information being known preferably before emulation. Advantageously, for example, it is noted that the geometrical information can also be input and/or saved into the channel coordinator device.

Further advantageously, at least a part of the geometrical information can be input and/or saved into at least a part, preferably each, of the at least two channel emulator devices. In this context, at least said part, preferably each, of the at least two channel emulator devices may be configured to provide at least said part of the geometrical information for the channel coordinator device, wherein the channel coordinator may especially be configured to form the geometrical information on the basis of the respective parts of the geometrical information.

According to a further preferred implementation form of the first aspect of the invention, the system further comprises at least one receiver device being in connection with the channel coordinator device and for receiving at least a part, preferably each, of the at least two corresponding radio frequency signals as at least one receive signal. In this context, the channel coordinator device is configured to determine at least a part of the geometrical information, preferably the geometrical information, on the basis of the at least one receive signal especially in an analytical manner and/or with the aid of artificial intelligence. Advantageously, for instance, exemplarily for the case that the spatial distribution of the at least two channel emulator devices is changed, the system can be calibrated in an automated manner, thereby ensuring a significantly high efficiency.

According to a further preferred implementation form of the first aspect of the invention, the system, especially the input device and/or the channel coordinator device of the system, further comprises a display for displaying an overview with respect to all corresponding available channels, preferably all respective objects in all corresponding available channels, more preferably all respective objects to be emulated in all corresponding available channels. Advantageously, for example, the manner of functioning with respect to the system can efficiently be monitored.

According to a further preferred implementation form of the first aspect of the invention, the system is used for and/or in the context of emulating and/or testing at least one of a radar receiver, a radar transmitter, radar echo, especially radar echo in the context of automotive and/or aerospace, a Lidar device, especially a Lidar sensor, an ultrasonic device, especially an ultrasonic sensor, satellite communication, especially a satellite communication channel, wireless communication, especially a wireless communication downlink and/or a wireless communication uplink, or any combination thereof. Advantageously, for instance, a high flexibility can be ensured, thereby achieving an increased efficiency.

According to a further preferred implementation form of the first aspect of the invention, at least a part, preferably all, of the at least two channel emulator devices is configured to form a radar target simulator. Advantageously, for example, especially in the context of testing autonomous vehicles or self-driving cars, respectively, traffic scenarios can efficiently be emulated.

According to a further preferred implementation form of the first aspect of the invention, the radar target simulator is configured to stimulate at least one sensor, preferably at least one radar sensor, more preferably multiple sensors, most preferably multiple radar sensors, especially in a synchronous manner. Advantageously, for instance, especially in the context of testing autonomous vehicles or self-driving cars, respectively, the corresponding test duration can significantly be reduced, which leads to an increased efficiency.

According to a further preferred implementation form of the first aspect of the invention, the radar target simulator is used for and/or in the context of testing an electronic control unit and/or an engine control unit and/or an autonomous vehicle. Advantageously, for example, advanced driver assistance systems can be tested in a full, accurate and efficient manner.

According to a second aspect of the invention, a channel coordinator device for a system for emulating radio frequency channels is provided. Said channel coordinator device comprises an input interface being connectable to an input device of the system and being configured to receive a channel scenario from the input device, and an output interface being connectable to at least two channel emulator devices of the system. In this context, the channel coordinator device is configured to control each of the at least two channel emulator devices via the output interface on the basis of the channel scenario and/or geometrical information with respect to the at least two channel emulator devices such that at least a part, preferably each, of the at least two channel emulator devices output a corresponding radio frequency signal to emulate the channel scenario. Advantageously, not only a particularly high accuracy and efficiency can be ensured, but also several devices under test can be tested simultaneously especially due to distribution and scalability of the at least two channel emulator devices.

With respect to the input interface, it is noted that said input interface can be a combined input-output interface.

With respect to the output interface, it is noted that said output interface can be a combined input-output interface, especially the above-mentioned input-output interface.

According to a first preferred implementation form of the second aspect of the invention, the channel coordinator device is configured to provide a sync signal via the output interface for at least a part, preferably each, of the at least two channel emulator devices for synchronizing the respective ones of the at least two channel emulator devices in accordance with a common time base. Advantageously, for instance, the channel coordinator device can be configured to send timestamping to at least the part, preferably each, of the at least two channel emulator devices, thereby reducing complexity, which leads to an increased efficiency.

According to a second preferred implementation form of the second aspect of the invention, the channel coordinator device is configured to control at least a part, preferably each, of the at least two channel emulator devices via the output interface such that fading is added to emulate multipath and/or atmospheric effects. Additionally or alternatively, at least a part, preferably all, of the at least two channel emulator devices is configured to form a radio frequency fading simulator, especially a distributed and/or scalable radio frequency fading simulator. In further addition to this or as a further alternative, fading is added for and/or in the context of wireless communication, mobile communication, satellite communication, or any combination thereof. Advantageously, for example, a real-world environment can be reproduced in a particularly realistic manner, which leads to a significantly high accuracy.

According to a further preferred implementation form of the second aspect of the invention, the channel coordinator device is configured to perform a channel mapping to the at least two channel emulator devices on the basis of the channel scenario and/or the geometrical information. Advantageously, for instance, as long as the configuration of the system, especially the spatial distribution of the at least two channel emulator devices, is not changed, the channel mapping has only to be performed once and then keeps being valid, thereby ensuring a high efficiency.

With respect to the second aspect of the invention, it is noted that further preferred implementation forms of the second aspect of the invention, which are not explicitly mentioned, have to be seen as being implicitly disclosed by analogy with the first aspect of the invention and its preferred implementation forms.

According to a third aspect of the invention, a method for emulating radio frequency channels is provided. Said method comprises the steps of inputting a channel scenario with aid of an input device, providing a channel coordinator device being in connection with the input device, providing at least two channel emulator devices each being in connection with the channel coordinator device and for outputting a corresponding radio frequency signal to emulate the channel scenario, and controlling each of the at least two channel emulator devices on the basis of the channel scenario and/or geometrical information with respect to the at least two channel emulator devices with the aid of the channel coordinator device. Advantageously, not only a particularly high accuracy and efficiency can be ensured, but also several devices under test can be tested simultaneously especially due to distribution and scalability of the at least two channel emulator devices.

With respect to the third aspect of the invention, it is noted that further preferred implementation forms of the third aspect of the invention, which are not explicitly mentioned, have to be seen as being implicitly disclosed by analogy with the first aspect of the invention and its preferred implementation forms or the second aspect of the invention and its preferred implementation forms, respectively.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
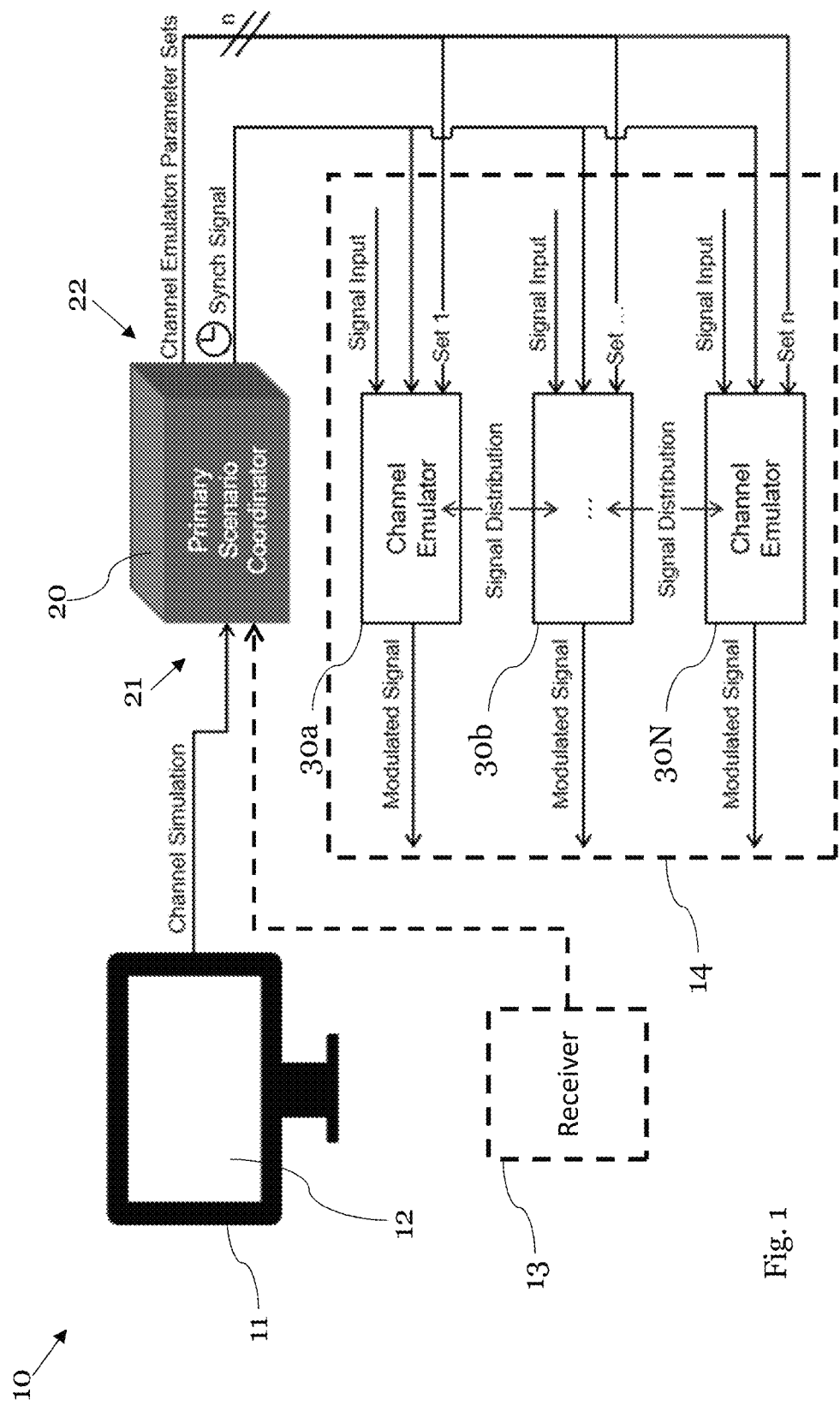
FIG. 1 shows an exemplary embodiment of the first aspect of the invention in combination with the second aspect of the invention.

With respect to FIG. 1, an exemplary embodiment of the inventive system 10 for emulating radio frequency channels is depicted.

Figure 2:
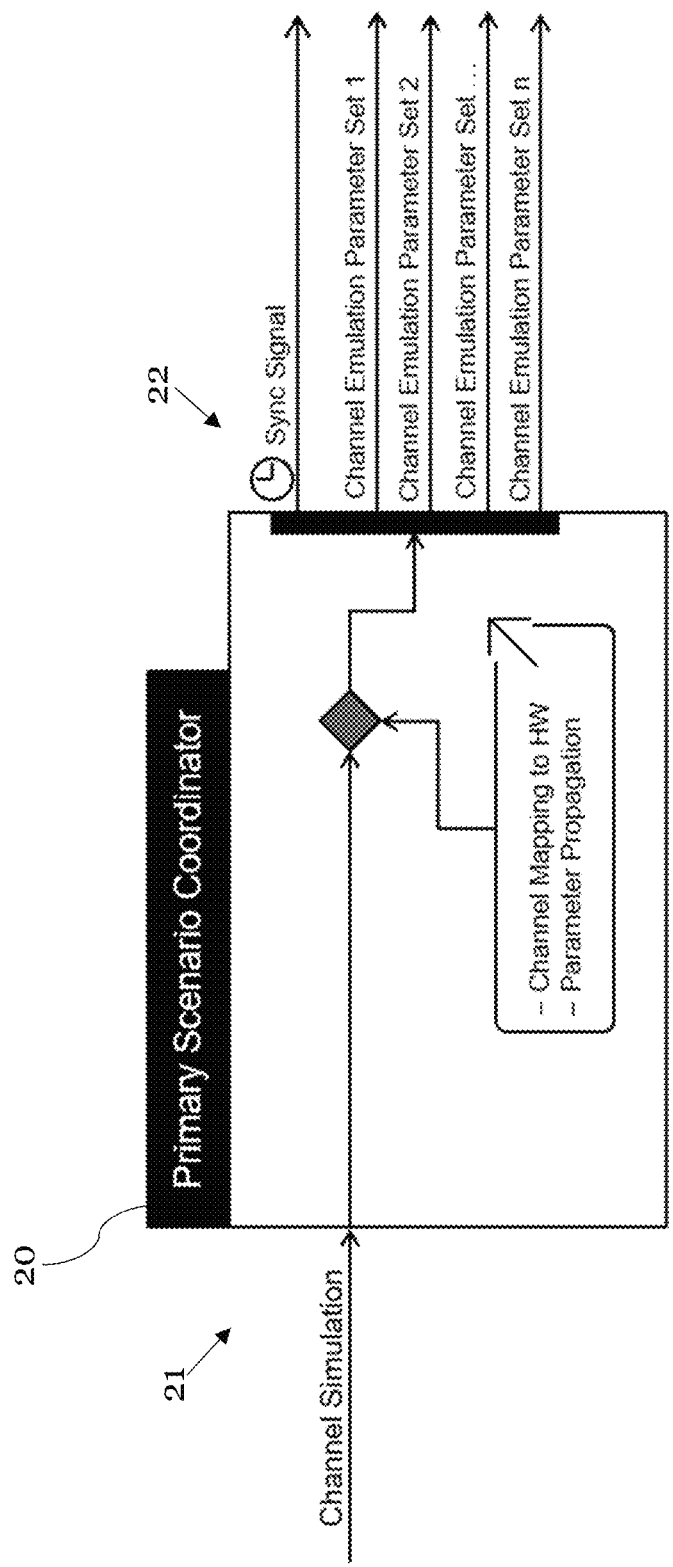
FIG. 2 shows the exemplary embodiment of the second aspect of the invention according to FIG. 1 in greater detail.

For the sake of completeness, it is noted that said FIG. 1 additionally illustrates an exemplary embodiment of the inventive channel coordinator device, exemplarily in the form of a primary scenario coordinator 20, which is also shown in greater detail in FIG. 2.

In accordance with FIG. 1, the system 10 comprises an input device 11 for inputting a channel scenario, the channel coordinator device or the primary scenario coordinator 20, respectively, being in connection with the input device 11, and at least two channel emulator devices, exemplarily n channel emulators 30a, 30b, . . . , 30N, each being in connection with the channel coordinator device or the primary scenario coordinator 20, respectively, and for outputting a corresponding radio frequency signal to emulate the channel scenario.

In this context, the channel coordinator device or the primary scenario coordinator 20, respectively, is configured to control each of the at least two channel emulator devices, exemplarily the n channel emulators 30a, 30b, . . . , 30N, on the basis of the channel scenario and/or geometrical information with respect to the at least two channel emulator devices, exemplarily the n channel emulators 30a, 30b, . . . , 30N.

With respect to the above-mentioned input device 11, it is noted that said input device 11 can be a computer, especially a personal computer as exemplarily shown in FIG. 1, a tablet, or a smart phone. Additionally or alternatively, the input device 11 can be a streaming source or a cloud, especially a cloud service or a cloud server. In further addition to this or as a further alternative, the input device 11 can be software-based source. Said software-based source may be run on a computer, especially a personal computer, a tablet, a smart phone, a server, or any combination thereof. Accordingly, the input device 11 has not necessarily to be a physical device but can also be seen as an input interface for inputting the channel scenario. It is noted that it might be particularly advantageous if the channel coordinator device or the primary scenario coordinator 20, respectively, comprises such an input interface. It is further noted that said input interface can also be a combined input-output interface.

With respect to the input interface comprised by the channel coordinator device or the primary scenario coordinator 20, respectively, it is noted that said input interface, which can also be an input-output interface, is exemplarily equipped with reference sign 21 in FIG. 1 and FIG. 2 depicting the channel coordinator device or the primary scenario coordinator 20, respectively, in greater detail.

As it can further be seen from FIG. 1, the channel coordinator device or the primary scenario coordinator 20, respectively, is configured to provide a sync signal for at least a part, preferably each, of the at least two channel emulator devices, exemplarily the n channel emulators 30a, 30b, . . . , 30N, for synchronizing the respective ones of the at least two channel emulator devices, exemplarily the n channel emulators 30a, 30b, . . . , 30N, in accordance with a common time base.

In this context, it is noted that the channel coordinator device or the primary scenario coordinator 20, respectively, may comprise an output interface for providing said sync signal. It is noted that said output interface can also be an input-output interface, exemplarily the above-mentioned input-output interface.

With respect to the output interface comprised by the channel coordinator device or the primary scenario coordinator 20, respectively, it is noted that said output interface, which can also be an input-output interface such as the above-mentioned input-output interface, is exemplarily equipped with reference sign 22 in FIG. 1 and FIG. 2.

Furthermore, said output interface 22 may be configured to provide at least two channel emulation parameter sets, exemplarily n channel emulation parameter sets, for the at least two channel emulator devices, exemplarily the n channel emulators 30*a*, 30*b*, . . . , 30N, especially in the context of controlling each of the at least two channel emulator devices, exemplarily each of the n channel emulators 30*a*, 30*b*, . . . , 30N.

Especially for the case that the output interface 22 comprises or is an input-output interface, at least a part, preferably each, of the at least two channel emulator devices, exemplarily of the n channel emulators 30*a*, 30*b*, . . . , 30N, may be configured to provide at least a part of the geometrical information for the channel coordinator device or the primary scenario coordinator 20, respectively, especially via said input-output interface.

Again, with respect to FIG. 1, it might be particularly advantageous if at least a part, preferably each, of the at least two channel emulator devices, exemplarily the n channel emulators 30*a*, 30*b*, . . . , 30N, is configured to perform a modulation to form the respective ones of the at least two corresponding radio frequency signals.

Figure 3:
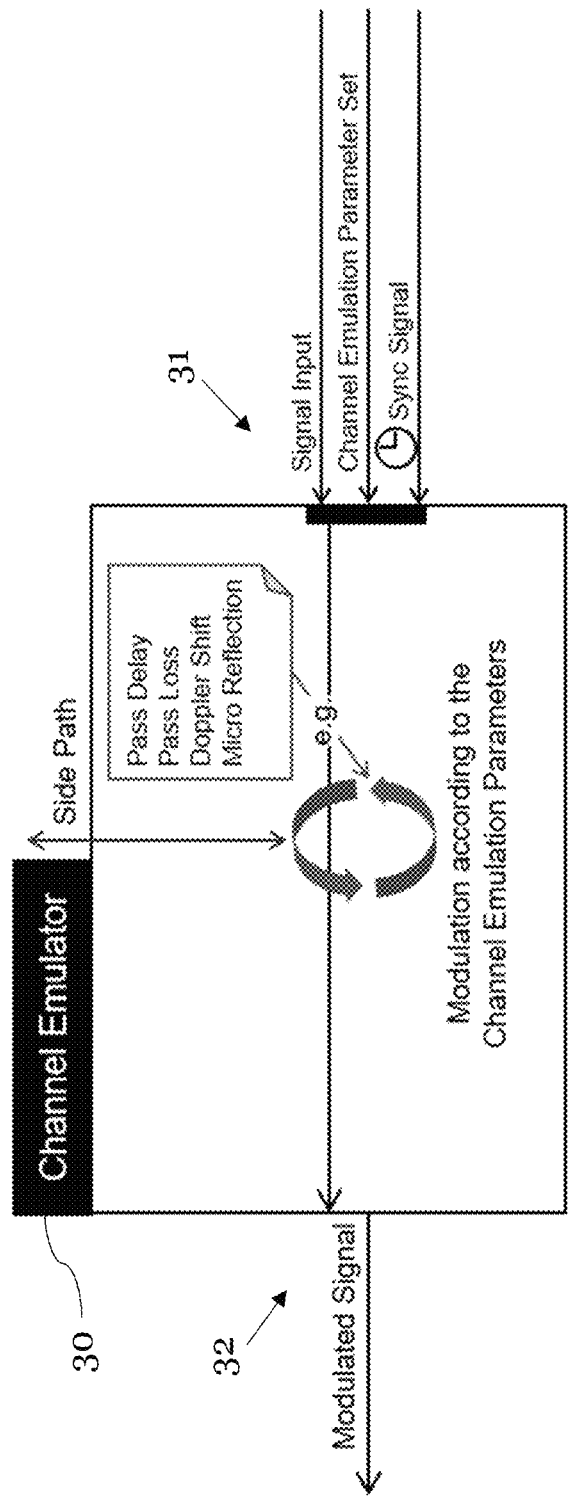
FIG. 3 shows an exemplary embodiment of a channel emulator device in the context of the invention.

In accordance with FIG. 3 showing an exemplary embodiment of a channel emulator device or a channel emulator 30, respectively, in the context of the invention, such as one of the n channel emulators 30*a*, 30*b*, . . . , 30N of FIG. 1, said modulation may take into account respective delay, especially pass delay, loss, especially pass loss, frequency shift, especially Doppler shift, reflection, especially micro reflection, or any combination thereof.

Accordingly, again in the light of FIG. 1, the channel coordinator device or the primary scenario coordinator 20, respectively, may be configured to control the modulation on the basis of the geometrical information and/or consideration of at least one of respective delay, especially pass delay, loss, especially pass loss, frequency shift, especially Doppler shift, reflection, especially micro reflection, or any combination thereof.

Furthermore, it might be particularly advantageous if the channel coordinator device or the primary scenario coordinator 20, respectively, is configured to control at least a part, preferably each, of the at least two channel emulator devices, exemplarily the n channel emulators 30*a*, 30*b*, . . . , 30N, such that fading is added to emulate multipath and/or atmospheric effects. In particular, it is noted that fading can be added to at least a part, preferably each, of the radio frequency channels or the at least two corresponding radio frequency signals, respectively, exemplarily the n corresponding radio frequency signals.

Moreover, it is noted that it might be particularly advantageous if the channel coordinator device or the primary scenario coordinator 20, respectively, is configured to perform a channel mapping to the at least two channel emulator devices, exemplarily the n channel emulators 30*a*, 30*b*, . . . , 30N, on the basis of the channel scenario and/or the geometrical information.

With respect to the above-mentioned channel scenario, it is noted that the channel scenario may preferably comprise or be at least one of a communication scenario, especially a communication link scenario, a radar scenario, a traffic scenario, or any combination thereof.

With respect to the above-mentioned geometrical information, it is noted that the geometrical information may especially comprise or be an absolute position of at least a part, preferably each, of the at least two channel emulator devices, exemplarily the n channel emulators 30*a*, 30*b*, . . . , 30N, and/or a relative position regarding at least a part, preferably each, of the at least two channel emulator devices, exemplarily the n channel emulators 30*a*, 30*b*, . . . , 30N, with respect to each other.

It is further noted that it might be particularly advantageous if the input device 11 is configured to input the geometrical information. In addition to this or as an alternative, the geometrical information may especially comprise or be information being known preferably before emulation.

As it can further be seen from FIG. 1, especially as an option, the system 10 may further comprise at least one receiver device, exemplarily the receiver 13, being in connection with the channel coordinator device or the primary scenario coordinator 20, respectively, and for receiving at least a part, preferably each, of the at least two corresponding radio frequency signals, exemplarily of the n corresponding radio frequency signals, as at least one receive signal.

In this context, the channel coordinator device or the primary scenario coordinator 20, respectively, may optionally be configured to determine at least a part of the geometrical information, preferably the geometrical information, on the basis of the at least one receive signal especially in an analytical manner and/or with the aid of artificial intelligence.

It is noted that the channel coordinator device or the primary scenario coordinator 20, respectively, may comprise an input interface, exemplarily the above-mentioned input interface, or a combined input-output interface, exemplarily the above-mentioned input-output interface, respectively, for receiving the least one receive signal.

Furthermore, it might be particularly advantageous if the system 10, exemplarily the input device 11 of the system 10, further comprises a display 12 for displaying an overview with respect to all corresponding available channels, preferably all respective objects in all corresponding available channels, more preferably all respective objects to be emulated in all corresponding available channels. Additionally or alternatively, the channel coordinator device or the primary scenario coordinator 20, respectively, may comprise a display, especially such a display 12. It is noted that said overview can be created on the basis of the channel scenario and/or the geometrical information. Accordingly, the input device 11 and/or the channel coordinator device or the primary scenario coordinator 20, respectively, can be configured to create said overview on the basis of the channel scenario and/or the geometrical information.

In this context, said display 12 or the input device 11, respectively, may be connected to the channel coordinator device or the primary scenario coordinator 20, respectively, especially via a combined input-output interface, exemplarily the above-mentioned input-output interface.

Moreover, it might be particularly advantageous if the system 10 is used for and/or in the context of emulating and/or testing at least one of a radar receiver, a radar transmitter, radar echo, especially radar echo in the context of automotive and/or aerospace, a Lidar device, especially a Lidar sensor, an ultrasonic device, especially an ultrasonic sensor, satellite communication, especially a satellite communication channel, wireless communication, especially a wireless communication downlink and/or a wireless communication uplink, or any combination thereof.

It is further noted that it might be particularly advantageous if at least a part, preferably all, of the at least two channel emulator devices, exemplarily the n channel emulators 30a, 30b, . . . , 30N, is configured to form a radar target simulator 14.

In addition to this or as an alternative, it might be particularly advantageous if at least a part, preferably all, of the at least two channel emulator devices, exemplarily the n channel emulators 30a, 30b, . . . , 30N, is configured to form a radio frequency fading simulator, especially a distributed and/or scalable radio frequency fading simulator.

In this context, all different radar sensors of a radar system under test can advantageously be stimulated and treat the radar system under test, especially being a radar system with many different radars, at once. Further advantageously, many different radar bands can be simulated. As a further advantage, multiple different things or radar targets, respectively, can be simulated at the same time. Further beneficially, radar targets can be simulated together with Lidar targets and/or ultrasonic targets.

It is noted that the radar target simulator 14 may be configured to stimulate at least one sensor, preferably at least one radar sensor, more preferably multiple sensors, most preferably multiple radar sensors, especially in a synchronous manner.

It is further noted that it might be particularly advantageous if the radar target simulator 14 is used for and/or in the context of testing an electronic control unit and/or an engine control unit and/or an autonomous vehicle.

Again, with respect to FIG. 2, it is noted that the channel coordinator device or the primary scenario coordinator 20, respectively, for a system for emulating radio frequency channels, such as the system 10 of FIG. 1, comprises, as already noted above, the input interface 21 being connectable to an input device of the system, such as the input device 11 of the system 10, and being configured to receive a channel scenario from the input device, and the output interface 22 being connectable to at least two channel emulator devices of the system, such as the n channel emulators 30a, 30b, . . . , 30N of the system 10.

In this context, the channel coordinator device or the primary scenario coordinator 20, respectively, is configured to control each of the at least two channel emulator devices, exemplarily each of the n channel emulators 30a, 30b, . . . , 30N, via the output interface or the combined input-output interface, respectively, on the basis of the channel scenario and/or geometrical information with respect to the at least two channel emulator devices, exemplarily the n channel emulators 30a, 30b, . . . , 30N, such that at least a part, preferably each, of the at least two channel emulator devices, exemplarily of the n channel emulators 30a, 30b, . . . , 30N, output a corresponding radio frequency signal to emulate the channel scenario.

As already mentioned above, it is noted again that each of the input interface 21 and the output interface 22 can be a combined input-output interface, especially the same combined input-output interface.

It might be particularly advantageous if the channel coordinator device or the primary scenario coordinator 20, respectively, is configured to provide a sync signal via the output interface or the combined input-output interface, respectively, for at least a part, preferably each, of the at least two channel emulator devices, exemplarily the n channel emulators 30a, 30b, . . . , 30N, for synchronizing the respective ones of the at least two channel emulator devices, exemplarily of the n channel emulators 30a, 30b, . . . , 30N, in accordance with a common time base.

As already mentioned above, the channel coordinator device or the primary scenario coordinator 20, respectively, may be configured to provide at least two channel emulation parameter sets, exemplarily n channel emulation parameter sets, for the at least two channel emulator devices, exemplarily for the n channel emulators 30a, 30b, . . . , 30N.

Accordingly, it might be particularly advantageous if the output interface 22 or the above-mentioned combined input-output interface, respectively, comprises at least three outputs, exemplarily n+1 outputs.

Furthermore, the channel coordinator device or the primary scenario coordinator 20, respectively, can be configured to control at least a part, preferably each, of the at least two channel emulator devices, exemplarily the n channel emulators 30a, 30b, . . . , 30N, via the output interface 22 such that fading is added to emulate multipath and/or atmospheric effects. In particular, it is noted that fading can be added to at least a part, preferably each, of the radio frequency channels or the at least two corresponding radio frequency signals, respectively, exemplarily the n corresponding radio frequency signals.

Moreover, it might be particularly advantageous if the channel coordinator device or the primary scenario coordinator 20, respectively, is configured to perform a channel mapping to the at least two channel emulator devices, exemplarily the n channel emulators 30a, 30b, . . . , 30N, on the basis of the channel scenario and/or the geometrical information.

As it can further be seen from FIG. 2, the channel coordinator device or the primary scenario coordinator 20, respectively, can be configured to perform a parameter propagation especially with respect to the at least two channel emulation parameter sets, exemplarily the n channel emulation parameter sets.

Again, with respect to FIG. 3, it is noted that the channel emulator device or the channel emulator 30, respectively, comprises an input interface 31, which can also be a combined input-output interface.

Especially for the case that the input interface 31 comprises or is a combined input-output interface, it is noted that it might be particularly advantageous if, especially at an output of said input-output interface, the channel emulator device or the channel emulator 30, respectively, provides at least one of its kind of device or emulator, its settings, its location, or any combination thereof.

In this context, especially for the case that the location of the channel emulator device or the channel emulator 30, respectively, is provided, the channel coordinator device or the primary scenario coordinator 20, respectively, can be configured to determine at least a part of the geometrical information on the basis of said location.

With respect to the input interface 31, it is noted that said input interface 31 may comprise an input for inputting the above-mentioned sync signal from the channel coordinator device or the primary scenario coordinator 20, respectively.

Furthermore, the input interface 31 may comprise at least two inputs, exemplarily n inputs, for inputting the above-mentioned at least two channel emulation parameter sets, exemplarily the n channel emulation parameters sets, from the channel coordinator device or the primary scenario coordinator 20, respectively.

Accordingly, it might be particularly advantageous if the input interface 31 comprises at least three inputs, exemplarily n+1 inputs.

As it can further be seen from FIG. 3, the input interface 31 can comprise a signal input for inputting a stimulus signal, exemplarily a stimulus signal provided by a signal generator. In this context, it might be particularly advantageous if the input interface 31 comprises at least four inputs, exemplarily n+2 inputs.

As an alternative, the channel emulator device or the channel emulator 30, respectively, may be configured to generate the stimulus signal especially in an internal manner. In particular, the channel emulator device or the channel emulator 30, respectively, can comprise a signal generator for generating the stimulus signal.

Furthermore, it might be particularly advantageous if the channel emulator device or the channel emulator 30, respectively, is configured to perform a modulation with respect to the stimulus signal to form a modulated signal. In this context, said modulation may preferably be performed in accordance with the respective channel emulation parameter set.

In accordance with FIG. 3, said modulation may preferably consider at least one of respective delay, especially pass delay, loss, especially pass loss, frequency shift, especially Doppler shift, reflection, especially micro reflection, or any combination thereof. Additionally or alternatively, the modulation may consider the above-mentioned geometrical information.

In further addition to this or as a further alternative, as exemplarily illustrated by FIG. 3, the modulation may consider a side path especially caused by interactions between at least two channel emulator devices or at least two channel emulators, respectively, preferably between at least two neighboring channel emulator devices or at least two neighboring channel emulators, respectively.

Moreover, the channel emulator device or channel emulator 30, respectively, comprises an output 32 for outputting the above-mentioned modulated signal. Said output 32 may preferably comprise or be at least one radio frequency radiation element. In particular, it might be particularly advantageous if the output 32 or the at least one radio frequency radiation element, respectively, comprises at least one of an antenna, especially an antenna array, a light-emitting element, especially a laser, an ultrasound-emitting element, especially an ultrasonic speaker, or any combination thereof.

Generally, it is noted that each of all the connections described above, especially connections between devices or elements, respectively, can be wired and/or wireless connections. Additionally or alternatively, said connections can be connections via a cloud and/or a server and/or the Internet.

Furthermore, especially in the light of the above-mentioned sync signal, it might be particularly advantageously if at least a part, preferably each, of the channel coordinator device or the primary scenario coordinator 20, respectively, and the channel emulator device or the channel emulator 30, respectively, comprises a timer or an internal timer, respectively, especially for guaranteeing the common time base.

Figure 4:
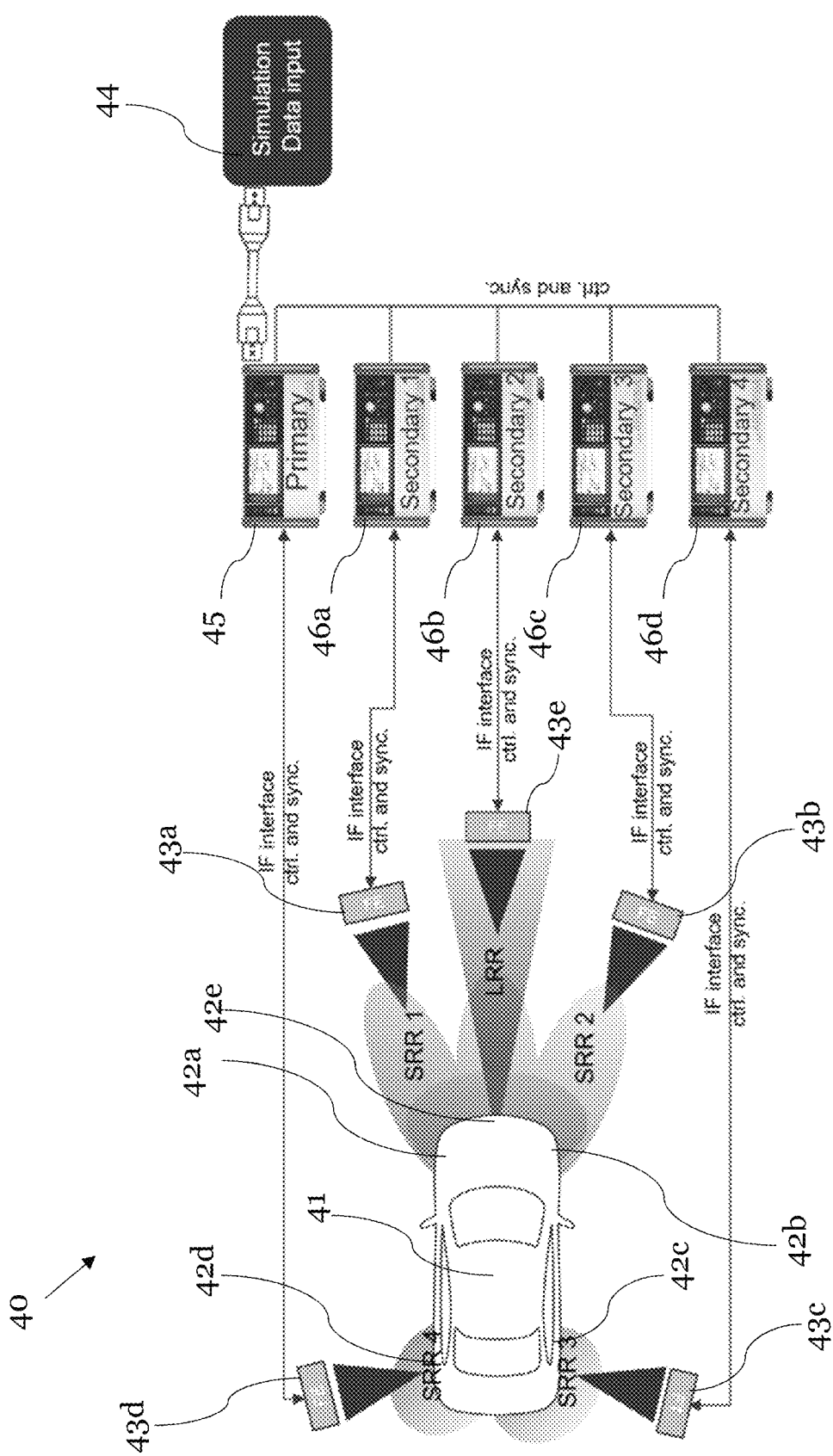
FIG. 4 shows a further exemplary embodiment of the first aspect of the invention in combination with the second aspect of the invention.

Now, with respect to FIG. 4, a further exemplary embodiment of the first aspect of the invention in combination with the second aspect of the invention is illustrated.

In particular, in this exemplary case, the system for emulating radio frequency channels according to the first aspect of the invention is embodied as a scalable echo generator 40 or scalable radar echo generator, respectively. Exemplarily, said scalable echo generator 40 is used for testing a vehicle such as a car 41 especially in the context of verifying correct functioning of advanced driver assistance systems and/or autonomous driving capabilities.

With respect to said vehicle or car 41, respectively, as it can be seen from FIG. 4, it is noted that said vehicle or car 41, respectively, comprises multiple sensors, especially multiple radar sensors 42a, 42b, 42c, 42d, 42e. Exemplarily, each sensor of a part of said radar sensors, exemplarily each of the radar sensors 42a, 42b, 42c, 42d, is a short range radar sensor, whereas each sensor of another part of said radar sensor, exemplarily the radar sensor 42e, is a long range radar sensor.

Furthermore, especially for generating a corresponding radar echo with respect to the radar sensors 42a, 42b, 42c, 42d, 42e, the scalable echo generator 40 comprises respective radio frequency frontends 43a, 43b, 43c, 43d, 43e. Preferably, the number of radio frequency frontends is equal to the number of sensors especially comprised by the vehicle.

Moreover, the scalable echo generator 40 comprises a simulation data input 44, for which the explanations above regarding the input device 11 may analogously apply. In addition to this, the scalable echo generator 40 comprises a primary target simulator 45 or a primary radar target simulator respectively, for which the explanations above regarding the primary scenario coordinator 20 may analogously apply. It is noted that said primary target simulator 45 is connected to the simulation data input 44.

It is further noted that the primary target simulator 45 is connected to at least one of the radio frequency frontends 43a, 43b, 43c, 43d, 43e, exemplarily to the radio frequency frontend 43d.

As it can further be seen from FIG. 4, the scalable echo generator 40 comprises at least one secondary target simulator or at least one secondary radar target simulator, respectively, exemplarily four secondary target simulators 46a, 46b, 46c, 46d, for each of which the explanations above regarding one of the n channel emulators 30a, 30b, . . . , 30N may analogously apply.

It is noted that in this exemplary case, each of the four secondary target simulators 46a, 46b, 46c, 46d is connected to a corresponding one of the radio frequency frontends 43a, 43b, 43c, 43e. In addition to this, each of the four secondary target simulators 46a, 46b, 46c, 46d is exemplarily connected to the primary target simulator 45.

With respect to the primary target simulator 45 and the at least one secondary target simulator, exemplarily the four secondary target simulators 46a, 46b, 46c, 46d, it is noted that at least a part, preferably each, of the primary target simulator 45 and the at least one secondary target simulator, exemplarily the four secondary target simulators 46a, 46b, 46c, 46d, can comprise or be a signal generator.

With respect to the connections to the radio frequency frontends 43a, 43b, 43c, 43d, 43e, it is noted that at least a part, preferably each, of said connections can be used for controlling and/or synchronizing, exemplarily controlling and synchronizing, the respective frontend.

In addition to this or as an alternative, with respect to the connection or the connections, respectively, between the primary target simulator 45 and the at least one secondary target simulator, exemplarily the four secondary target simulators 46a, 46b, 46c, 46d, it is noted the at least a part, preferably each, of said connection or connections, respectively, can be used for controlling and/or synchronizing, exemplarily controlling and synchronizing, the respective secondary target simulator.

For further illumination of the scalable echo generator 40 in the sense of an embodiment of the inventive system, said scalable echo generator 40 or system, respectively, is summarized in an abstract manner in the following.

Generally, such an embodiment of the inventive system may be a system comprising at least one target simulator with at least one radio frequency frontend, especially at least one remote radio frequency frontend, with which one or more sensors can preferably be stimulated synchronously. Control information such as an object list can especially be fed into a central system component from an external source. The exact positions of the objects can be determined either from a global central reference frame or relative to the coordinate system of the individual sensors. This information may especially be distributed to the downstream components preferably via an asynchronous network. An additional synchronization interface can enable time-synchronous switching, phase and frequency coupling. Advantageously, electronic control units or engine control units, respectively, that especially implement advanced driver assistance systems and/or autonomous driving functions preferably using multiple radar sensors can thus be fully tested. In other words, the invention advantageously allows for full simulation of advanced driver assistance systems and/or autonomous driving functionalities that especially fuse input from multiple sensors.

Figure 5:
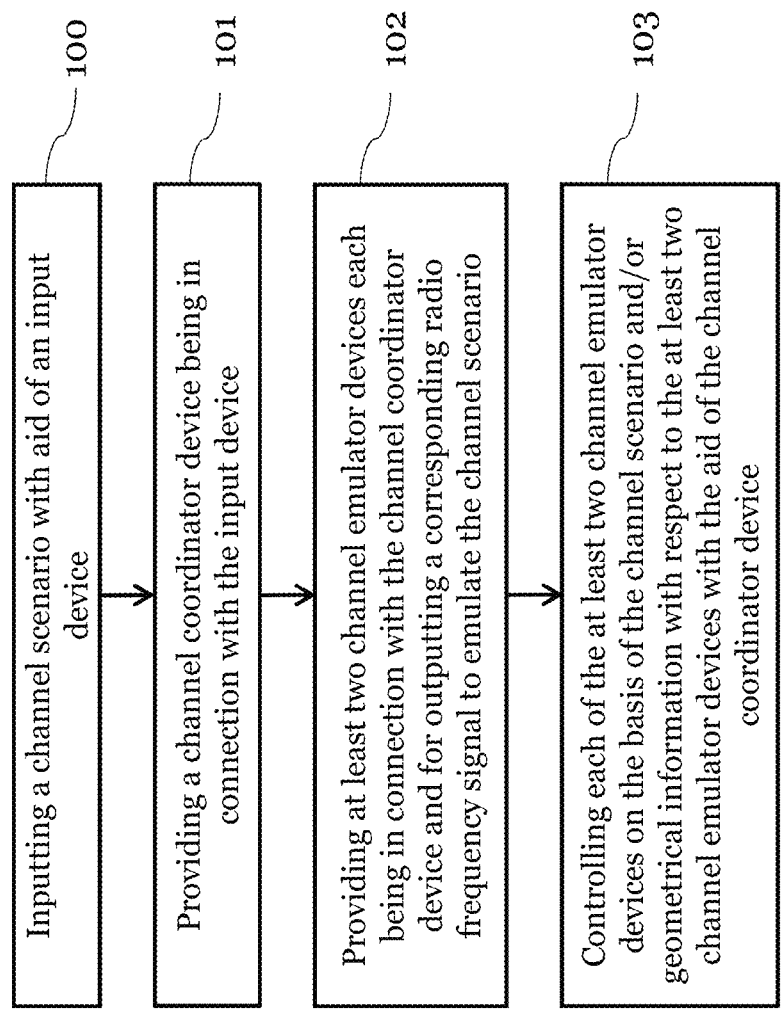
FIG. 5 shows a flow chart of an exemplary embodiment of the third aspect of the invention.

Finally, FIG. 5 illustrates a flow chart of an exemplary embodiment of the inventive method for emulating radio frequency channels. A first step 100 of said method comprises inputting a channel scenario with aid of an input device. Furthermore, a second step 101 comprises providing a channel coordinator device being in connection with the input device. Moreover, a third step 102 comprises providing at least two channel emulator devices each being in connection with the channel coordinator device and for outputting a corresponding radio frequency signal to emulate the channel scenario. A fourth step 103 of the method comprises controlling each of the at least two channel emulator devices on the basis of the channel scenario and/or geometrical information with respect to the at least two channel emulator devices with the aid of the channel coordinator device While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for emulating radio frequency channels, the system comprising:
    an input device for inputting a channel scenario,
    a channel coordinator device being in connection with the input device, and
    at least two channel emulator devices each being in connection with the channel coordinator device and for outputting a corresponding radio frequency signal to emulate the channel scenario,
    wherein the channel coordinator device is configured to control each of the at least two channel emulator devices on the basis of the channel scenario and geometrical information with respect to the at least two channel emulator devices,
    wherein the channel scenario comprises or is at least one of a communication scenario, especially a communication link scenario, a radar scenario, a traffic scenario, or any combination thereof, and
    wherein the geometrical information comprises or is an absolute position of at least a part of the at least two channel emulator devices and/or a relative position regarding at least a part of the at least two channel emulator devices with respect to each other.

2. The system according to claim 1,
    wherein the channel coordinator device is configured to provide a sync signal for at least a part, preferably each, of the at least two channel emulator devices for synchronizing the respective ones of the at least two channel emulator devices in accordance with a common time base.

3. The system according to claim 1,
    wherein at least a part, preferably each, of the at least two channel emulator devices is configured to perform a modulation to form the respective ones of the at least two corresponding radio frequency signals.

4. The system according to claim 3,
    wherein the channel coordinator device is configured to control the modulation on the basis of the geometrical information and/or consideration of at least one of respective delay, especially pass delay, loss, especially pass loss, frequency shift, especially Doppler shift, reflection, especially micro reflection, or any combination thereof.

5. The system according to claim 1,
    wherein the channel coordinator device is configured to control at least a part, preferably each, of the at least two channel emulator devices such that fading is added to emulate multipath and/or atmospheric effects, and/or
    wherein at least a part, preferably all, of the at least two channel emulator devices is configured to form a radio frequency fading simulator, especially a distributed and/or scalable radio frequency fading simulator, and/or
    wherein fading is added for and/or in the context of wireless communication, mobile communication, satellite communication, or any combination thereof.

6. The system according to claim 1,
    wherein the channel coordinator device is configured to perform a channel mapping to the at least two channel emulator devices on the basis of the channel scenario and/or the geometrical information.

7. The system according to claim 1, wherein the geometrical information comprises or is an absolute position of each of the at least two channel emulator devices and/or a relative position regarding each of the at least two channel emulator devices with respect to each other.

8. The system according to claim 1,
wherein the input device is configured to input the geometrical information, and/or
wherein the geometrical information comprises or is information being known preferably before emulation.

9. The system according to claim 1,
wherein the system further comprises:
at least one receiver device being in connection with the channel coordinator device and for receiving at least a part, preferably each, of the at least two corresponding radio frequency signals as at least one receive signal,
wherein the channel coordinator device is configured to determine at least a part of the geometrical information, preferably the geometrical information, on the basis of the at least one receive signal especially in an analytical manner and/or with the aid of artificial intelligence.

10. The system according to claim 1,
wherein the system, especially the input device and/or the channel coordinator device of the system, further comprises:
a display for displaying an overview with respect to all corresponding available channels, preferably all respective objects in all corresponding available channels, more preferably all respective objects to be emulated in all corresponding available channels.

11. The system according to claim 1,
wherein the system is used for and/or in the context of emulating and/or testing at least one of a radar receiver, a radar transmitter, radar echo, especially radar echo in the context of automotive and/or aerospace, a Lidar device, especially a Lidar sensor, an ultrasonic device, especially an ultrasonic sensor, satellite communication, especially a satellite communication channel, wireless communication, especially a wireless communication downlink and/or a wireless communication uplink, or any combination thereof.

12. The system according to claim 1,
wherein at least a part, preferably all, of the at least two channel emulator devices is configured to form a radar target simulator.

13. The system according to claim 12,
wherein the radar target simulator is configured to stimulate at least one sensor, preferably at least one radar sensor, more preferably multiple sensors, most preferably multiple radar sensors, especially in a synchronous manner.

14. The system according to claim 12,
wherein the radar target simulator is used for and/or in the context of testing an electronic control unit and/or an engine control unit and/or an autonomous vehicle.

15. A channel coordinator device for a system for emulating radio frequency channels according to claim 1, the channel coordinator device comprising:
an input interface being connectable to an input device of the system and being configured to receive a channel scenario from the input device,
an output interface being connectable to at least two channel emulator devices of the system,
wherein the channel coordinator device is configured to control each of the at least two channel emulator devices via the output interface on the basis of the channel scenario and geometrical information with respect to the at least two channel emulator devices such that at least a part, preferably each, of the at least two channel emulator devices output a corresponding radio frequency signal to emulate the channel scenario.

16. The channel coordinator device according to claim 15,
wherein the channel coordinator device is configured to provide a sync signal via the output interface for at least a part, preferably each, of the at least two channel emulator devices for synchronizing the respective ones of the at least two channel emulator devices in accordance with a common time base.

17. The channel coordinator device according to claim 15,
wherein the channel coordinator device is configured to control at least a part, preferably each, of the at least two channel emulator devices via the output interface such that fading is added to emulate multipath and/or atmospheric effects, and/or
wherein at least a part, preferably all, of the at least two channel emulator devices is configured to form a radio frequency fading simulator, especially a distributed and/or scalable radio frequency fading simulator, and/or
wherein fading is added for and/or in the context of wireless communication, mobile communication, satellite communication, or any combination thereof.

18. The channel coordinator device according to claim 15,
wherein the channel coordinator device is configured to perform a channel mapping to the at least two channel emulator devices on the basis of the channel scenario and/or the geometrical information.

19. A method for emulating radio frequency channels, the method using a system according to claim 1 and comprising the steps of:
inputting a channel scenario with aid of an input device,
providing a channel coordinator device being in connection with the input device,
providing at least two channel emulator devices each being in connection with the channel coordinator device and for outputting a corresponding radio frequency signal to emulate the channel scenario, and
controlling each of the at least two channel emulator devices on the basis of the channel scenario and geometrical information with respect to the at least two channel emulator devices with the aid of the channel coordinator device.

* * * * *